(12) United States Patent
Nakajima et al.

(10) Patent No.: US 8,736,234 B2
(45) Date of Patent: May 27, 2014

(54) POWER CONVERTER CONTROL APPARATUS

(75) Inventors: Kenji Nakajima, Chiyoda-ku (JP); Masato Mori, Chiyoda-ku (JP); Kenichi Akita, Chiyoda-ku (JP); Mitsunori Tabata, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 402 days.

(21) Appl. No.: 13/270,772

(22) Filed: Oct. 11, 2011

(65) Prior Publication Data

US 2012/0262130 A1    Oct. 18, 2012

(30) Foreign Application Priority Data

Apr. 14, 2011    (JP) .................................. 2011-090075

(51) Int. Cl.
*H02P 9/00*    (2006.01)
(52) U.S. Cl.
USPC .............................................. 322/34; 322/33
(58) Field of Classification Search
USPC .......................................... 322/28, 33, 34, 59
See application file for complete search history.

(56) References Cited

U.S. PATENT DOCUMENTS

| | | | |
|---|---|---|---|
| 7,230,399 B2 * | 6/2007 | Kuribayashi et al. | 318/434 |
| 7,538,523 B2 * | 5/2009 | Kitamura et al. | 322/33 |
| 7,911,188 B2 * | 3/2011 | Wada et al. | 322/44 |
| 7,973,517 B2 * | 7/2011 | Nakajima et al. | 322/24 |
| 8,334,680 B2 * | 12/2012 | Akita et al. | 322/59 |
| 8,339,074 B2 * | 12/2012 | Nakajima et al. | 318/139 |
| 8,397,847 B2 * | 3/2013 | Tabata et al. | 180/65.21 |
| 2008/0074087 A1 | 3/2008 | Oshima et al. | |
| 2012/0262130 A1 * | 10/2012 | Nakajima et al. | 322/34 |

FOREIGN PATENT DOCUMENTS

| | | |
|---|---|---|
| JP | 10-56799 A | 2/1998 |
| JP | 10-234200 A | 9/1998 |
| JP | 2002-218799 A | 8/2002 |
| JP | 2007-215277 A | 8/2007 |
| JP | 2009-130954 A | 6/2009 |
| JP | 2010-081741 A | 4/2010 |

OTHER PUBLICATIONS

Japanese Office Action dated May 7, 2013 issued in Patent Application No. 2011-090075.

* cited by examiner

*Primary Examiner* — Nicholas Ponomarenko
(74) *Attorney, Agent, or Firm* — Sughrue Mion, PLLC

(57) ABSTRACT

A power converter control apparatus includes a power converter part having a bridge circuit formed of a switching element and a field circuit controlling conduction of a field winding in an AC generator, and a control apparatus part having a field current detector, a temperature detector detecting a temperature of a generator part, the power converter part, or the control apparatus part, a field current instruction computation portion computing a field current instruction value of the generator, a temperature rise suppression portion computing a generated current suppression value on the basis of an output of the temperature detector and computing a field current suppression value on the basis of the computed generated current suppression value, a field current instruction selection portion selecting the field current instruction value or the field current suppression value whichever is the smaller, and a field current control portion controlling a field current.

13 Claims, 17 Drawing Sheets

POWER CONVERTER CONTROL APPARATUS

BACKGROUND OF THE INVENTION

1. Field of the Invention

The present invention relates to a power converter control apparatus that is mounted chiefly on a vehicle and controls an AC generator for vehicle having an armature winding and a field winding and operating as a generator after an engine is started.

2. Background Art

A vehicle, such as an automobile, equipped with an AC generator for vehicle (hereinafter, referred to simply as a generator) employs a power converting apparatus for vehicle provided between DC devices, such as a battery and lights, and a generator, which is an AC device, and performing two-way power conversion.

Generally, such a power converting apparatus for vehicle is connected between the generator and the battery and has a multi-phase bridge circuit formed of a plurality of diode elements. The power converting apparatus for vehicle converts AC power generated by the generator to DC power by rectifying the AC power using the multi-phase bridge circuit and supplies the battery and the DC devices with the converted DC power.

Recently, there has been proposed a power converting apparatus for vehicle using a switching element and an accompanying parasitic diode instead of diodes and adopting rectification by the switching element (hereinafter, referred to as synchronous rectification) because efficiency is higher and the element generates less heat when adopting the synchronous rectification than when adopting the rectification using a diode bride. Switching control of the switching element is performed according to a conducting state of the parasitic diode.

An example of the apparatus in the related art is described, for example, in Patent Document 1. According to this apparatus, when the generator starts generating power, diode rectification is performed by the parasitic diode. As an amount of power generation by the generator increases, the diode rectification shifts to the synchronous rectification. The generator generates power in such a manner that temperatures in all the regions of the generator and a generator control apparatus are maintained at or below an allowable temperature. The generator and the generator control apparatus are thus prevented from damage caused by overheat.

In a case where regenerative generation that recovers deceleration energy of a vehicle is performed by the generator control apparatus as above, when the temperatures in all the regions of the generator and the generator control apparatus are not higher than the allowable temperature, an upper limit value of a field current having an influence on an amount of power generation can be set higher during regenerative generation than during normal power generation. Accordingly, because more power can be generated by regenerative generation than by normal power generation, deceleration energy can be regenerated more effectively.
Patent Document 1: JP-A-2010-81741

It should be noted, however, that the generator is used inside an engine room of the vehicle in a hot environment. Hence, in a mode to regenerate deceleration energy, more heat is generated by an armature winding and a switching element in the generator because of a large generated current and the temperatures in the respective regions of the generator and the generator control apparatus rise. It thus becomes necessary to reduce the generated current, which is the cause of heat generation, by lowering the field current so that the temperatures in the respective regions do not exceed the allowable temperature. Patent Document 1, however, neither teaches nor suggests a specific countermeasure.

The temperatures may be lowered by a method of reducing the generated current by lowering the field current, and the field current is lowered by setting a lower upper limit value by multiplying the upper limit value of the field current for every rotation speed determined according to a maximum output characteristic of the generator by a constant coefficient. Alternatively, the temperature may be lowered by a method of reducing the generated current by limiting the field current at a constant value.

According to the method of multiplying the upper limit value of the field current by a constant coefficient, the temperatures are lowered because heat generated by the armature winding and the switching element is suppressed by reducing the generated current by limiting the field current. Accordingly, the upper limit value multiplied by a constant coefficient is the upper limit value of the generated current at a rotation speed with which heat generation reaches a maximum. Hence, the generated current may be suppressed excessively at a rotation speed lower than the rotation speed specified above, because there is a region where heat generation is small due to smallness of the generated current and suppression of the generated current is unnecessary.

At a rotation speed higher than the rotation speed specified above, the generated current is suppressed more than during normal power generation. However, whether a temperature rise is suppressed sufficiently with the suppressed generated current is unknown and therefore whether the temperatures in the respective regions are not higher than the allowable temperature is also unknown.

SUMMARY OF THE INVENTION

The invention is devised to solve the problems discussed above and has an object to obtain a power converter control apparatus not only capable of suppressing a temperature rise in respective parts by controlling a field current so as to limit a generated current by computing a generated current suppression value in accordance with a temperature of any one of a generator part, a power converter part, and a control apparatus part and a rotation speed of the generator part, but also capable of broadening a region of normal power generation by preventing the generated current from being limited excessively.

A power converter control apparatus according to an aspect of the invention is connected to a multi-phase AC generator having an armature winding and a field winding and configured to control an output of the multi-phase AC generator. The power converter control apparatus is formed of a power converter part and a control apparatus part. The power converter part includes a bridge circuit that is formed of a positive arm switching element and a negative arm switching element and rectifies an AC current as an output of the armature winding to a DC current, and a field circuit that controls conduction of the field winding using a field switching element. The control apparatus part includes: a field current detection portion that detects a field current flowing to the field winding; a temperature detection portion that detects a temperature of any one of the multi-phase AC generator, the power converter part, and the control apparatus part; a field current instruction computation portion that computes a field current instruction value on the basis of an operation state of the multi-phase AC generator; a temperature rise suppression portion that computes a generated current suppression value on the basis of an output of the temperature detection portion and computes a field current suppression value on the basis of the generated current suppression value; a field current instruction selection portion that selects one of outputs of the field current instruction value and the field current suppression value whichever is the smaller; and a field current control portion that controls the field current so that an output of the field current instruction selection portion coincides with the field current flowing to the field winding.

The power converter control apparatus configured as above computes the generated current suppression value in accordance with a temperature of the generator part, the power converter part, or the control apparatus part, and the rotation speed and the rectification method of the generator part. Hence, there can be achieved the advantages as follows. That is, it becomes possible to limit the generated current so that temperatures in the respective parts are not higher than an allowable temperature. It also becomes possible to broaden a region not subject to suppression of the generated current by preventing an amount of power generation from being limited excessively. Further, it becomes possible to prevent the generator part, the power converter part, and the control apparatus part from heat-induced damage.

The foregoing and other object, features, aspects, and advantages of the present invention will become more apparent from the following detailed description of the present invention when taken conjunction with the accompanying drawings.

DESCRIPTION OF THE PREFERRED EMBODIMENTS

Figure 1:
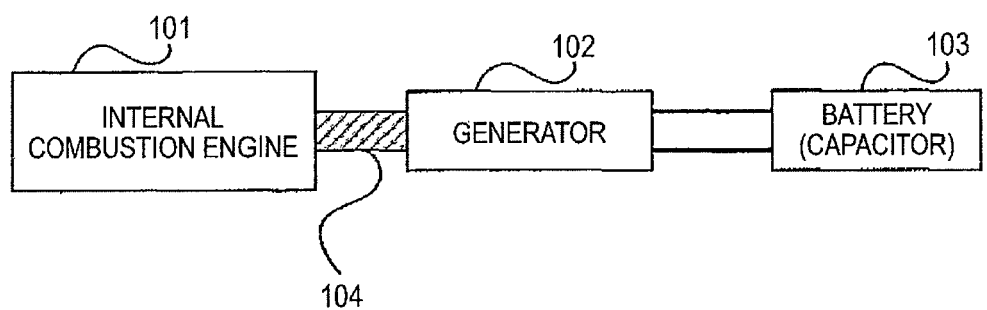
FIG. 1 is a conceptual view showing the overall configuration of a vehicle system employing a generator as a rotating electric machine to which the invention is applied.

Hereinafter, embodiments of the invention will be described in detail with reference to the drawings. Like components are labeled with like reference numerals in the respective drawings.

First Embodiment

Figure 2:
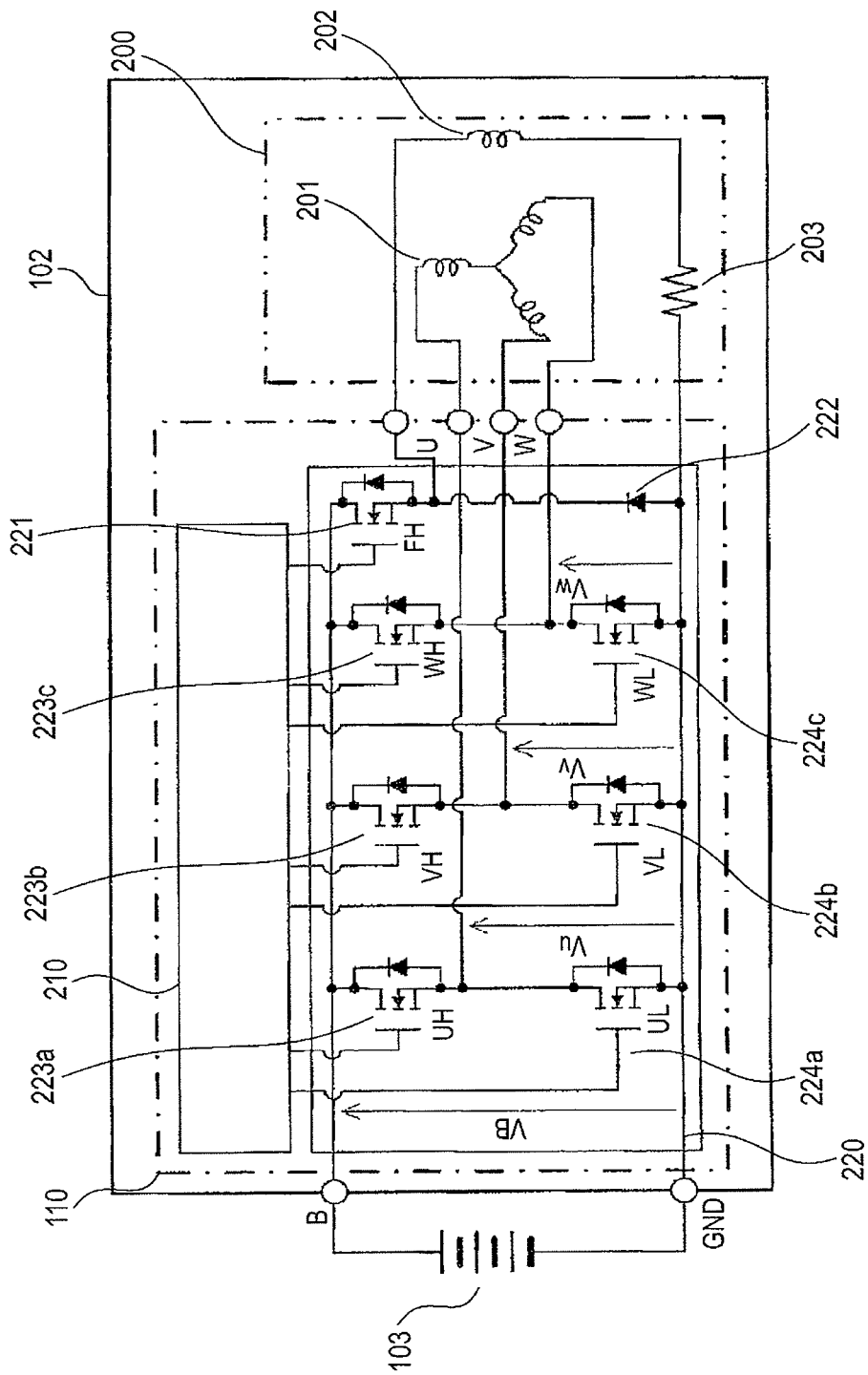
FIG. 2 is a view schematically showing the configuration of a power converter control apparatus according to a first embodiment of the invention.
Figure 3:
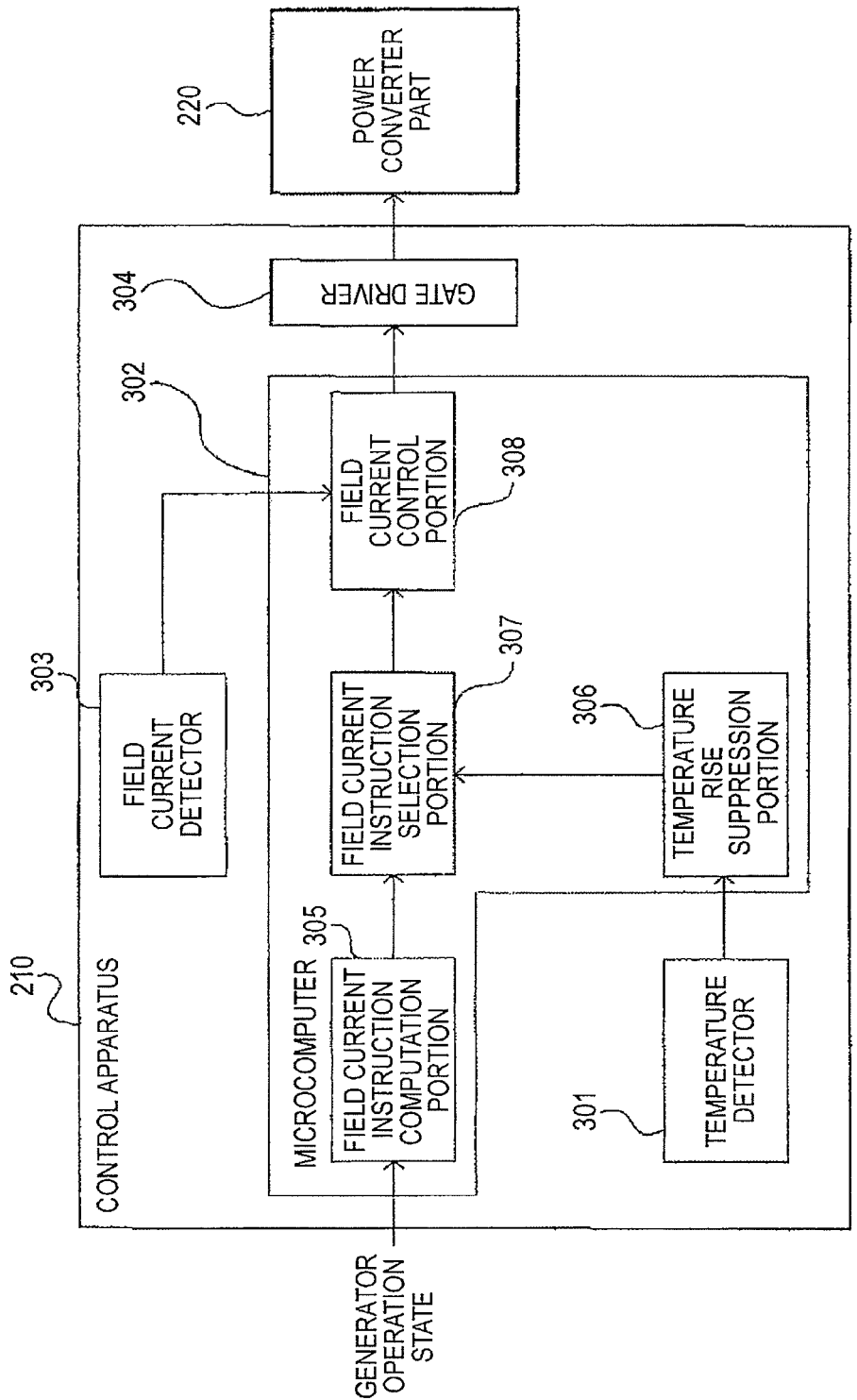
FIG. 3 is a view showing the configuration of a control apparatus part according to the first embodiment of the invention.

FIG. 1 is a conceptual view of a vehicle system employing a generator as a rotating electric machine. FIG. 2 is a view showing the configuration of a power converter control apparatus according to a first embodiment of the invention. FIG. 3 is a block diagram showing the configuration of a power converter control apparatus part according to the first embodiment of the invention.

Referring to FIG. 1, an internal combustion engine 101 is connected to a generator 102 via a power transmission portion 104, for example, a belt. An AC voltage generated by the generator 102 while the internal combustion engine 101 is operating is converted to a DC voltage by a power converter. Electric energy is thus supplied to DC devices and simultaneously to a battery and a capacitor 103.

Referring to FIG. 2, the generator 102 is formed of a power converting apparatus 110 and a generator part 200. The power converting apparatus 110 is formed of a power converter part 220 and a control apparatus part 210 that controls ON and OFF operations of a switching element.

The power converter part 220 is formed of a field switching element 221 to apply PWM control on a field current flowing to a field winding 202, a free wheel diode 222 connected to the switching element 221 in series, three-phase upper (positive) arm switching elements 223a, 223b, and 223c each having an internal parasitic diode, and three-phase lower (negative) arm switching elements 224a, 224b, and 224c each having an internal parasitic diode (hereinafter, these switching elements are collectively referred to as the switching elements 223 or 224 by omitting small letters at the end).

The three-phase upper arm switching elements 223 each are connected to a terminal B, which is a plus power supply input from the battery or the capacitor 103, and respectively connected to U, V, and W terminals of a three-phase armature winding 201 in the generator part 200. The three-phase lower arm switching elements 224 each are connected to a GND terminal, which is a ground input from the battery or the capacitor 103, and respectively connected to the U, V, and W terminals of the three-phase armature winding 201.

FIG. 2 shows the generator part 200 as a generator of a three-phase field winding method having the three-phase armature winding 201 and the field winding 202. However, a generator of a different winding method or having a different number of phases is also available. Further, the generator 102 is of an integral structure in which the power converting apparatus 110 and the generator part 200 are formed in one unit. However, the generator 102 may be of a separate structure in which the power converting apparatus 110 and the generator part 200 are physically isolated.

Furthermore, a generator is not necessarily employed and a generator motor capable of performing a driving (power running) operation is also available.

An internal configuration of the control apparatus part 210 will now be described with reference to FIG. 3.

The control apparatus part 210 is formed of a temperature detector 301, a microcomputer 302, a field current detector 303, and a gate driver 304. The microcomputer 302 is formed of a field current instruction computation portion 305, a temperature rise suppression portion 306, a field current instruction selection portion 307, and a field current control portion 308. Although the control apparatus part 210 and the microcomputer 302 are furnished with various functions as a vehicle power converter other than those shown in FIG. 3, descriptions will be given to only those relevant to the invention.

The temperature detector 301 detects a temperature of the generator 102, the power converter part 220, or the control apparatus part 210 using a temperature sensor, converts a voltage value, which is a sensor value, to a microcomputer AD (Analog-to-Digital) input range, and inputs the result to the microcomputer 302.

The field current detector 303 detects a current flowing to the field winding 202 using a current sensor 203, converts a voltage value, which is a sensor value, to the microcomputer AD input range, and inputs the result to the microcomputer 302.

The gate driver 304 makes a switching action by performing gate operations of the switching elements 221, 223, and 224 in the power converter part 220 according to a PWM signal determined by the microcomputer 302.

During a power generation operation, the microcomputer 302 controls a field current in accordance with an operation of the generator 102 so that a desired generated voltage or a generated torque is obtained.

For example, in an operation mode to control a generated voltage of the generator 102, a voltage at an input and output terminal (hereinafter, referred to as a B-terminal voltage) is controlled to follow a generated voltage instruction. To this end, the field current instruction computation portion 305 performs voltage feedback control using the generated voltage instruction indicating an operation state of the generator 102 and the B-terminal voltage as inputs and computes a field current instruction. The field current instruction selection portion 307 receives an output of the field current instruction computation portion 305 and an output of the temperature rise suppression portion 306 as inputs and outputs whichever is the smaller.

When the temperature detected by the temperature detector 301 is not higher than a threshold, the operation mode shifts to the operation mode to control the generated voltage and when the detected temperature is higher than the threshold, the generated current is suppressed so that the detected temperature drops.

The field current control portion 308 performs current feedback control using an output of the field current instruction selection portion 307 and an output of the field current detector 303 as inputs and computes an ON time (or duty) to output a PWM signal. The gate driver 304 then controls the field current by switching ON and OFF the field switching element 221 according to the PWM signal. By the operations described above, the B-terminal voltage is controlled to follow the generated voltage instruction.

In an operation mode to control a generated torque of the generator 102, the field current instruction computation portion 305 computes a field current instruction by which the generated torque matches a generated torque instruction. Thereafter, by performing control on the field current in the same manner as described above, a desired generated torque can be obtained. In an operation mode to control the generated current, the field current instruction computation portion 305 computes a field current instruction by which a desired generated current is obtained. By computing the field current instruction in accordance with an operation state of the generator 102, it becomes possible to obtain a desired generated current.

In this manner, the microcomputer 302 controls the generated voltage and the generated torque to take a desired value in accordance with an operation state of the generator 102. Known techniques may be used for the control method as above.

The temperature rise suppression portion 306 will now be described. The temperature rise suppression portion 306 computes a generated current suppression value on the basis of an output of the temperature detector 301 and then computes a field current suppression value on the basis of the computed generated current suppression value. A computation method of the generated current suppression value will be described below.

The field current instruction selection portion 307 will now be described. The field current instruction selection portion 307 receives outputs of the field current instruction computation portion 305 and the temperature rise suppression portion 306 as inputs and outputs a minimum value of input signals as a field current instruction.

By selecting the minimum value of the input signals, the field current suppression value, which is an output of the temperature rise suppression portion 306, becomes larger than an output of the field current instruction computation portion 305 in a case where there is no need to suppress the generated current because the temperature detected by the temperature detector 301 is low. The field current instruction selection portion 307 therefore selects the field current instruction, which is an output of the field current instruction computation portion 305. Meanwhile, in a case where the detected temperature is high, a generated current suppression value and a field current suppression value corresponding to the temperature are computed to suppress the generated current. In a case where the computed field current suppression value is smaller than the field current instruction, which is an output of the field current instruction computation portion 305, the field current instruction selection portion 307 outputs the field current suppression value as the field current instruction to suppress the generated current. Accordingly, a temperature rise is suppressed by suppressing the generated current.

In a case where the field current suppression value is larger than the field current instruction, which is an output of the field current instruction computation portion 305, because there is no need to suppress the generated current, the field current instruction selection portion 307 outputs the field current instruction, which is an output of the field current instruction computation portion 305.

The field current control portion 308 performs current feedback control using, as inputs, the field current instruction, which is an output of the field current instruction selection portion 307, and the field current, which is an output of the field current detector 303, and computes an ON time (or duty) to output a PWM signal. The PWM signal is then inputted into the gate driver 304 so that the field current is controlled by switching ON and OFF the field switching element 221.

Figure 4:
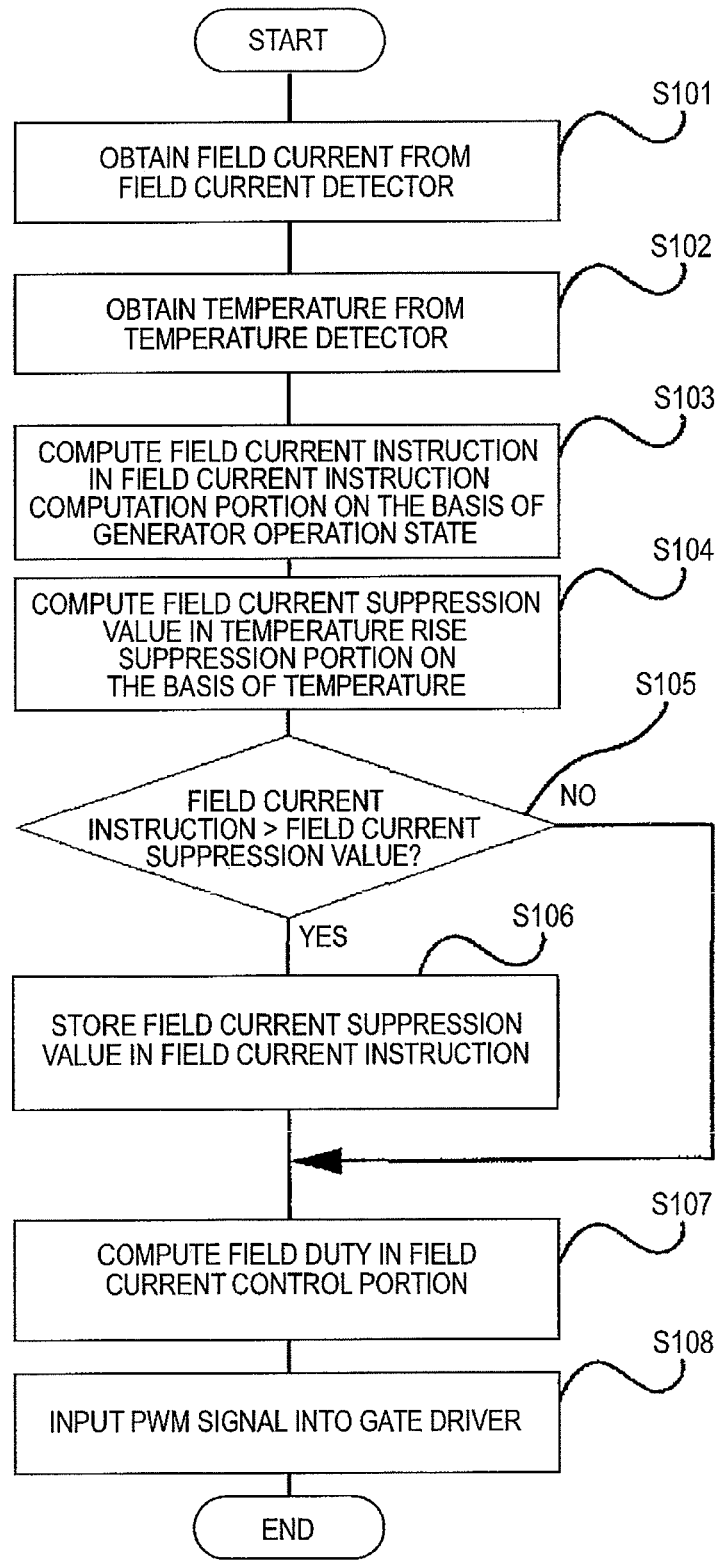
FIG. 4 is a flowchart depicting an operation of the control apparatus part according to the first embodiment of the invention.

FIG. 4 is a flowchart depicting an operation of the control apparatus part 210 of the first embodiment.

In Step S101, afield current is obtained from the field current detector 303 and the field current is inputted into an A-to-D converter in the microcomputer 302 to obtain a physical amount.

In Step S102, a temperature is obtained from the temperature detector 301 and the detected temperature is inputted into the A-to-D converter in the microcomputer 302 to obtain a physical amount. In Step S103, a field current instruction corresponding to an operation state of the generator 102 is computed in the field current instruction computation portion 305. When the generator 102 is in an operation mode to control the generated voltage, the field current instruction computation portion 305 computes a field current instruction by which the B-terminal voltage follows the generated voltage. When the generator 102 is in an operation mode to control the generated torque, the field current instruction computation portion 305 computes a field current instruction by which a desired generated torque is outputted. When the generator 102 is an operation mode to control the generated current, the field current instruction computation portion 305 computes a field current instruction by which a desired generated current is outputted. In Step S104, the temperature rise suppression portion 306 computes a generated current suppression value corresponding to the temperature and computes a field current suppression value on the basis of the computed generated current suppression value.

In Step S105, the field current instruction selection portion 307 compares the field current instruction computed in the field current instruction computation portion 305 with the field current suppression value computed in the temperature rise suppression portion 306. When the field current suppression value is smaller than the field current instruction, the flow proceeds to Step S106 in which the field current suppression value is outputted as the field current instruction. Conversely, when the field current suppression value is larger than the field current instruction, the field current instruction computed in Step S103 is outputted and the flow proceeds to Step 107. In step 107, the field current control portion 308 computes a duty on the basis of the field current instruction selected by the field current instruction selection portion 307 and the field current detected by the field current detector 303. In Step S108, a PWM signal of the duty computed in the field current control portion 308 is inputted into the gate driver 304 to drive the field switching element 221 in the power converter part 220.

Figure 5:
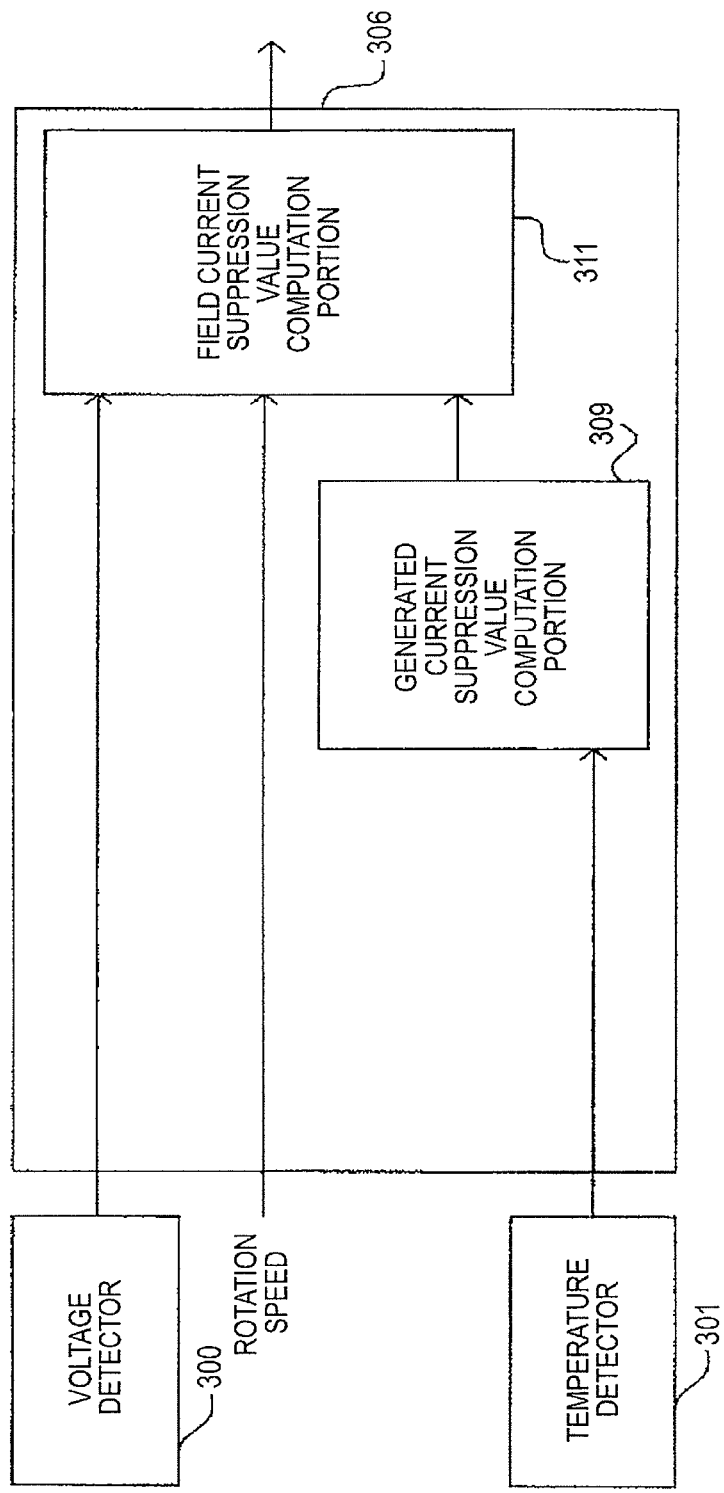
FIG. 5 is a view showing the configuration of a temperature rise suppression portion according to the first embodiment of the invention.

The configuration of the temperature rise suppression portion 306 will now be described using FIG. 5.

The temperature rise suppression portion 306 is formed of a generated current suppression value computation portion 309 and a field current suppression value computation portion 311. The generated current suppression value computation portion 309 receives an output of the temperature detector 301 as an input and calculates a generated current suppression value in accordance with the detected temperature.

Figure 6:
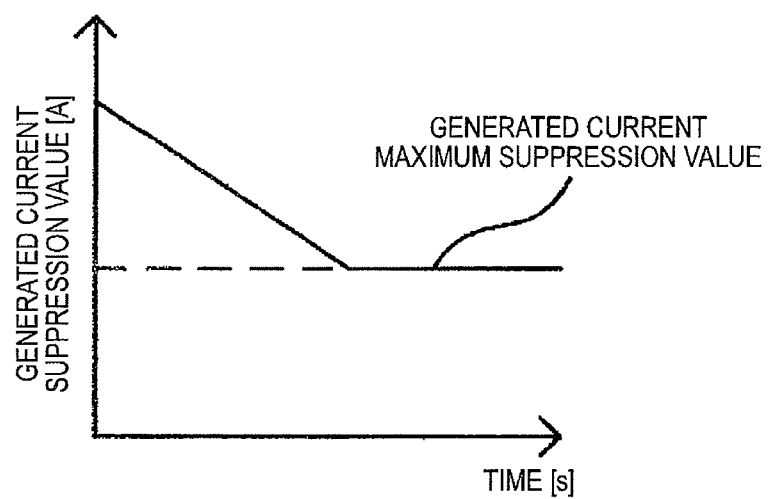
FIG. 6 is a view showing an example of generated current suppression by a generated current suppression value computation portion according to the first embodiment of the invention.

As is shown in FIG. 6, the generated current suppression value computation portion 309 merely sets the generated current suppression value in accordance with a time when the temperature detected by the temperature detector 301 is not lower than a first temperature threshold. By suppressing the generated current in accordance with an empirically-based time obtained preliminarily using a generated current with which the detected temperature does not exceed an allowable value, it becomes possible to suppress a temperature rise.

Figure 7:
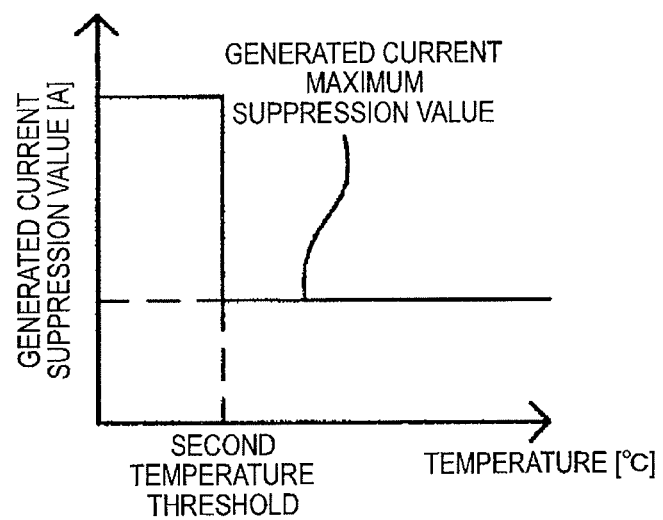
FIG. 7 is a view showing another example of the generated current suppression by the generated current suppression value computation portion according to the first embodiment of the invention.

Alternatively, as is shown in FIG. 7, when the detected temperature is not lower than a second temperature threshold, the generated current suppression value computation portion 309 merely sets a generated current suppression value so as to suppress the generated current suppression value as much as possible. By suppressing the generated current so that the detected temperature does not exceed the allowable value, it becomes possible to suppress a temperature rise.

Figure 8:
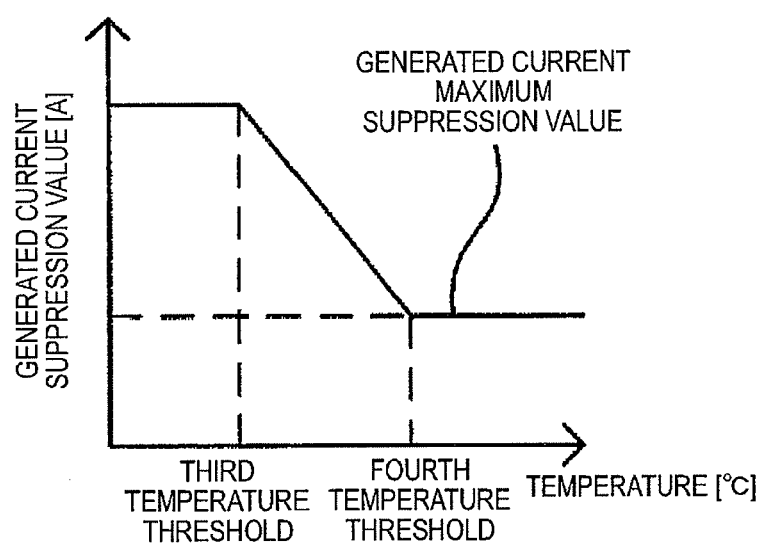
FIG. 8 is a view showing still another example of the generated current suppression by the generated current suppression value computation portion according to the first embodiment of the invention.

Further, as is shown in FIG. 8, when the detected temperature is not lower than a third temperature threshold, the generated current suppression value computation portion 309 computes a generated current suppression value on the basis of a generated current maximum suppression value with which the generated current suppression value is suppressed to a maximum extent possible at a fourth temperature threshold, a maximum value of the generated current, and the detected temperature. When the detected temperature is not lower than the fourth temperature threshold, the generated current suppression value computation portion 309 sets the generated current suppression value to the generated current maximum suppression value. By suppressing the generated current so that the detected temperature does not exceed the allowable value, it becomes possible to suppress a temperature rise. By computing the generated current suppression value on the basis of the third temperature threshold, the generated current is suppressed gradually with a temperature rise. It thus becomes possible to prevent an abrupt change of the generated current and the generated torque. The generated current can be suppressed by any one of the generated current suppression methods as above in accordance with the temperature.

The field current suppression value computation portion 311 receives, as inputs, an output of the generated current suppression value computation portion 309, the B-terminal voltage, which is an output of a voltage detector 300 detecting a voltage between the input and output terminal and a casing of the generator 102 as GND, and a rotation speed of the generator 102. A map is created in advance from preliminarily obtained empirically-based data representing a relation among the generated current, the field current, the rotation speed, and the B-terminal voltage and the map thus created is pre-stored in an internal ROM of the microcomputer 302. The field current suppression value computation portion 311 computes the field current suppression value using the map data on the basis of the B-terminal voltage, the rotation speed, and the generated current suppression value inputted therein.

Figure 9:
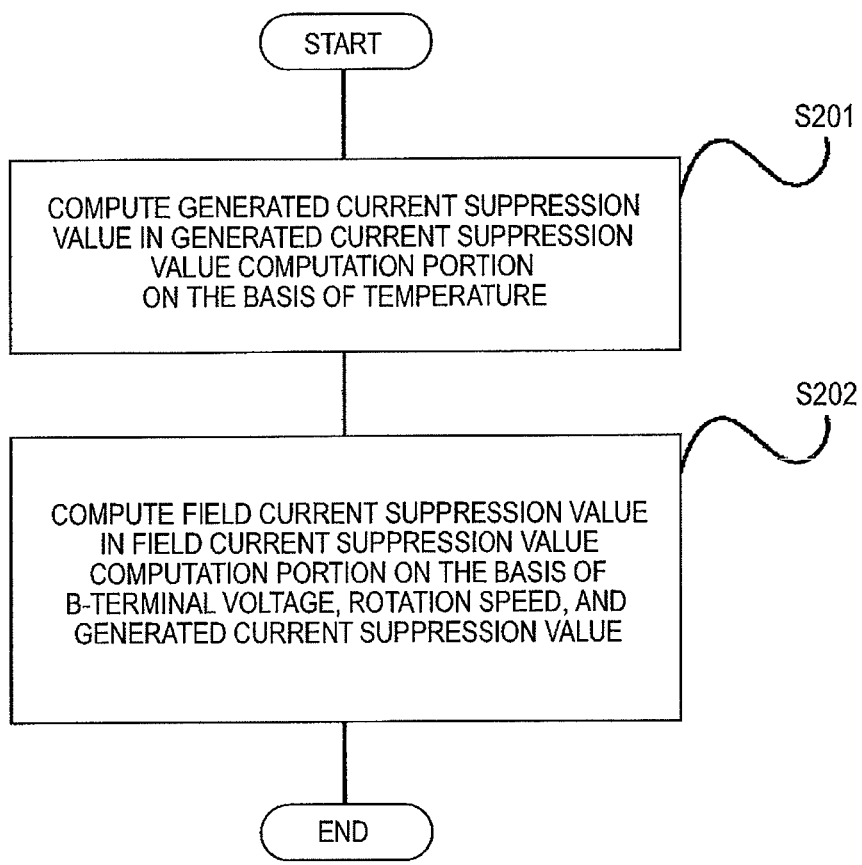
FIG. 9 is a flowchart depicting an operation of the temperature rise suppression portion according to the first embodiment of the invention.

FIG. 9 is a flowchart depicting an operation of the temperature rise suppression portion 306 of the first embodiment.

In Step S201, the temperature, which is an output of the temperature detector 301, is inputted into the generated current suppression value computation portion 309 and the generated current suppression value is computed therein. In Step S202, the voltage, which is an output of the voltage detector 300 detecting a voltage at the input and output terminal of the generator 102, the rotation speed of the generator 102, and the generated current suppression value computed in the generated current suppression value computation portion 309 are inputted into the field current suppression value computation portion 311 and the field current suppression value is computed therein.

As has been described, with the power converter control apparatus according to the first embodiment of the invention, the generated current suppression value is computed in accordance with the temperature detected in any one of the generator part, the power converter part, and the control apparatus part and the field current suppression value is computed on the basis of the computed generated current suppression value, the B-terminal voltage, and the rotation speed. The power converter control apparatus suppresses the generated current when the field current suppression value is smaller than the field current instruction value. It thus becomes possible to broaden the generation region not to subject to suppression by avoiding excessive suppression.

Figure 10:
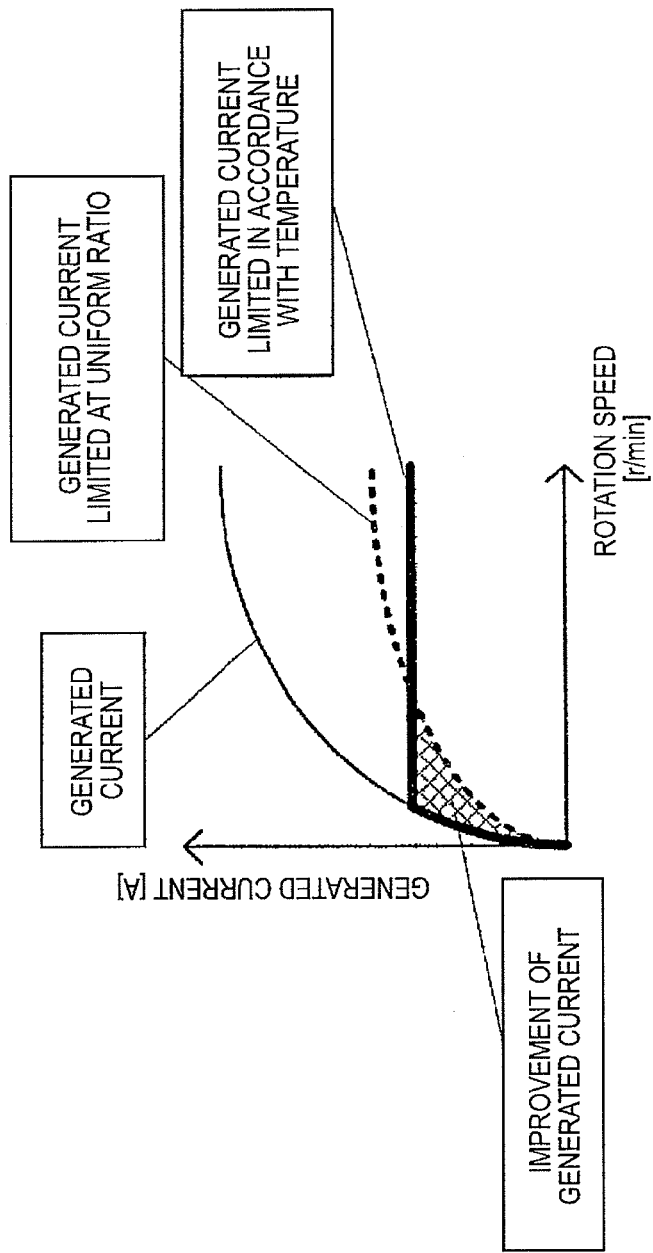
FIG. 10 is a view showing generated current suppression by the temperature rise suppression portion according to the first embodiment of the invention.

More specifically, as is shown in FIG. 10, according to a method of limiting the generated current by multiplying an upper limit value of the generated current by a constant coefficient, the generated current is limited by multiplying the upper limit value of the generated current at a rotation speed with which an amount of heat generation reaches a maximum by a constant coefficient. Hence, at a rotation speed lower than the rotation speed specified above, the generated current may possibly be suppressed excessively because the generated current is small and so is heat generation. In contrast, because suppression is not performed more than necessary in the invention, the generated current is not suppressed excessively in a region where a rotation speed is lower than the rotation speed specified above.

Moreover, it becomes possible to prevent the generator part, the power converter part, and the control apparatus part from heat-induced damage.

Second Embodiment

A power converter control apparatus according to a second embodiment of the invention will now be described on the basis of FIG. 11. In the second embodiment, only the temperature rise suppression portion 306, which is a difference from the first embodiment above, will be described in detail.

The configuration of a temperature rise suppression portion 306 of the second embodiment will be described using FIG. 11.

Figure 11:
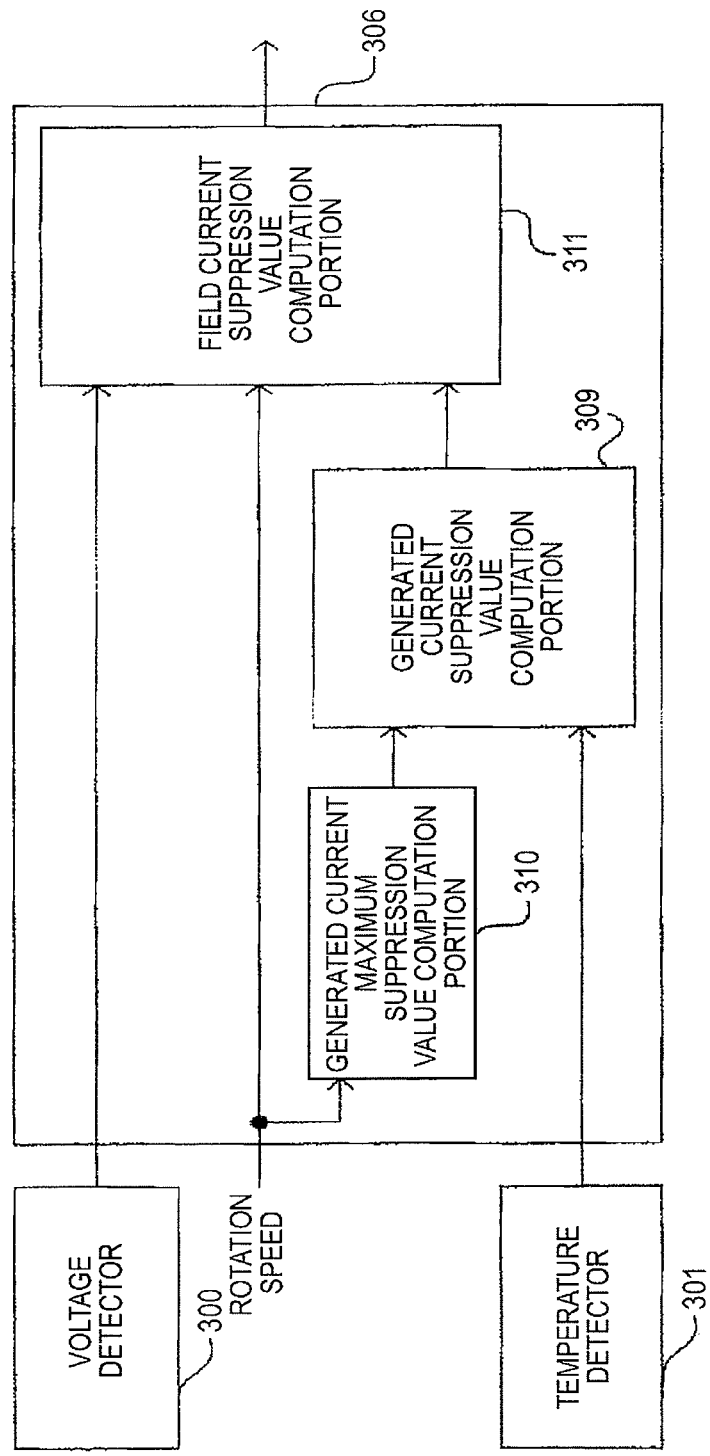
FIG. 11 is a view showing the configuration of a temperature rise suppression portion according to a second embodiment of the invention.

Referring to FIG. 11, the temperature rise suppression portion 306 is formed of a generated current suppression value computation portion 309, a generated current maximum suppression value computation portion 310, and a field current suppression value computation portion 311. The generated current maximum suppression value computation portion 310 receives a rotation speed as an input and computes a generated current maximum suppression value corresponding to the rotation speed.

The generated current maximum suppression value is Preliminarily obtained empirically-based data and a generated current with which a temperature rise takes a desired value is set for every rotation speed. The generated current suppression value computation portion 309 receives an output of the temperature detector 301 and an output of the generated current maximum suppression value computation portion 310 as inputs and calculates a generated current suppression value in accordance with the temperature detected by the temperature detector 301 and the generated current maximum suppression value.

The field current suppression value computation portion 311 receives the B-terminal voltage detected by the voltage detector 300, the rotation speed of the generator 102, and an output of the generated current suppression value computation portion 309 as inputs and computes a field current suppression value.

Figure 12:
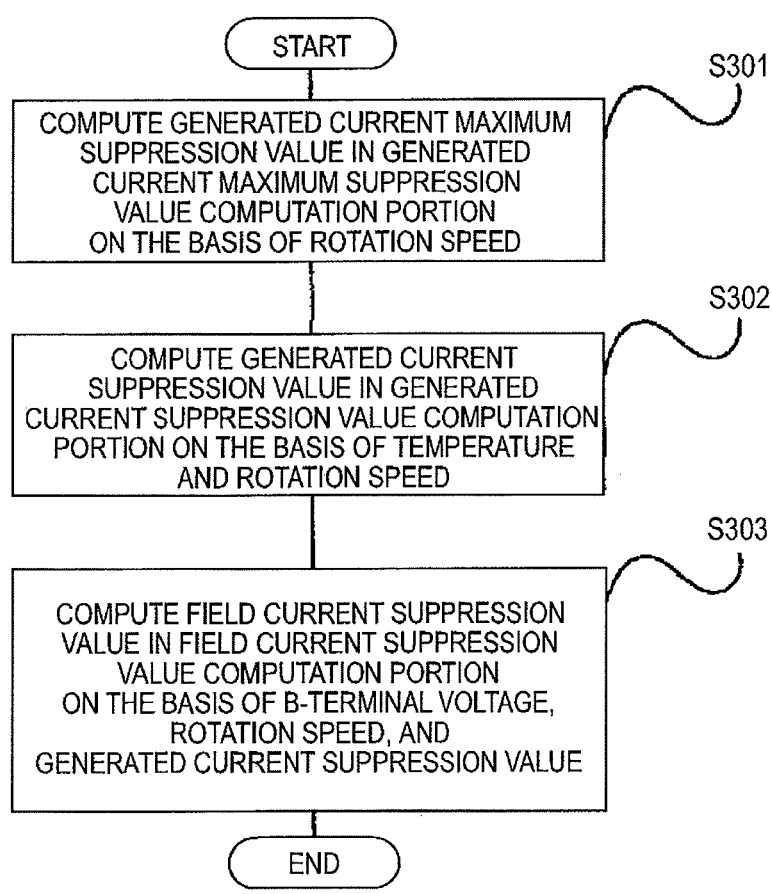
FIG. 12 is a flowchart depicting an operation of the temperature rise suppression portion according to the second embodiment of the invention.

FIG. 12 is a flowchart depicting an operation of the temperature rise suppression portion 306 of the second embodiment.

In Step S301, the rotation speed of the generator 102 is inputted into the generated current maximum suppression value computation portion 310 and the generated current maximum suppression value corresponding to the rotation speed is computed therein. In Step S302, the temperature, which is an output of the temperature detector 301, and the generated current maximum suppression value computed in Step S301 are inputted into the generated current suppression value computation portion 309 and the generated current suppression value is computed therein. In Step S303, the B-terminal voltage, which is an output of the voltage detector 300 detecting a voltage at the input and output terminal of the generator 102, the rotation speed of the generator 102, and an output of the generated current suppression value computation portion 309 are inputted into the field current suppression value computation portion 311 and the field current suppression value is computed therein.

Figure 13:
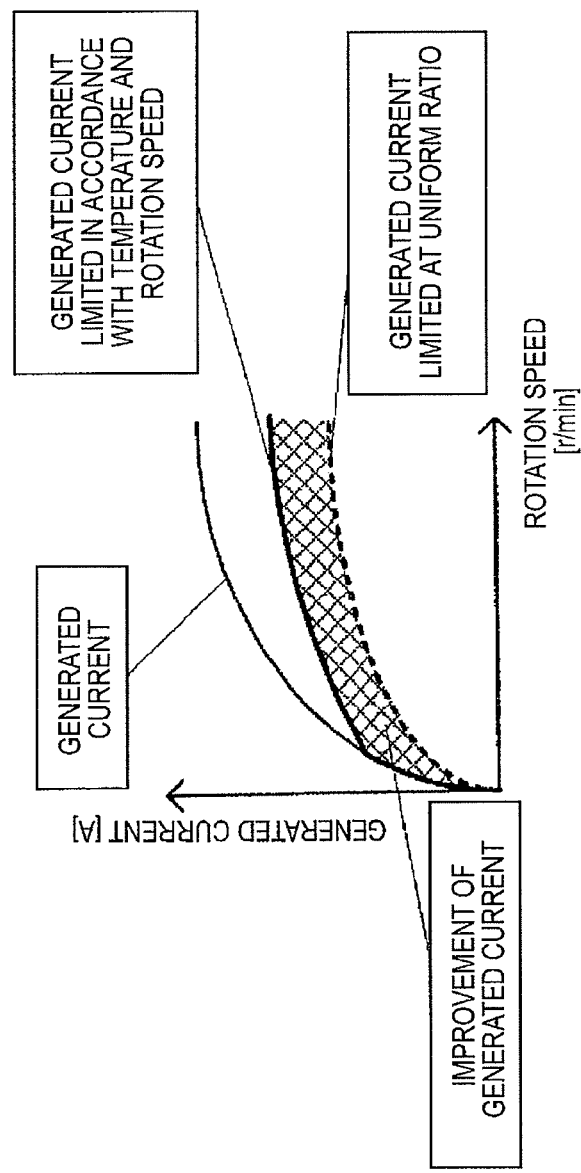
FIG. 13 is a view showing generated current suppression by the temperature rise suppression portion according to the second embodiment of the invention.

According to the second embodiment configured as above, the generated current maximum suppression value is computed in accordance with the rotation speed of the generator 102 and the generated current suppression value is computed in accordance with the detected temperature and the computed generated current maximum suppression value. It thus becomes possible to compute the generated current suppression value corresponding to the rotation speed. Accordingly, as is shown in FIG. 13, because the generated current suppression value is computed appropriately for every rotation speed, the suppressed generated current can be larger than that in the first embodiment above.

According to the method of limiting the generated current by multiplying the upper limit value of the generated current by a constant coefficient, a limiting ratio is calculated for the generated current at a rotation speed with which an amount of heat generation reaches a maximum. Hence, at a rotation speed higher than the rotation speed specified above, although the generated current is suppressed by multiplying the upper limit value by a constant coefficient, whether the temperature stays at or below the allowable temperature with the suppressed generated current is unknown. In contrast, because the generated current maximum suppression value suppressing a temperature rise is set for every rotation speed in the second embodiment, the generated current suppression value is computed in accordance with the rotation speed and the temperature. It thus becomes possible to broaden a normal generation region not subject to suppression of the generated current.

Third Embodiment

A power converter control apparatus according to a third embodiment of the invention will now be described on the basis of FIG. 14. In the third embodiment, only the temperature rise suppression portion 306, which is a difference from the second embodiment above, will be described in detail.

The configuration of a temperature rise suppression portion 306 of the third embodiment will be described using FIG. 14.

Figure 14:
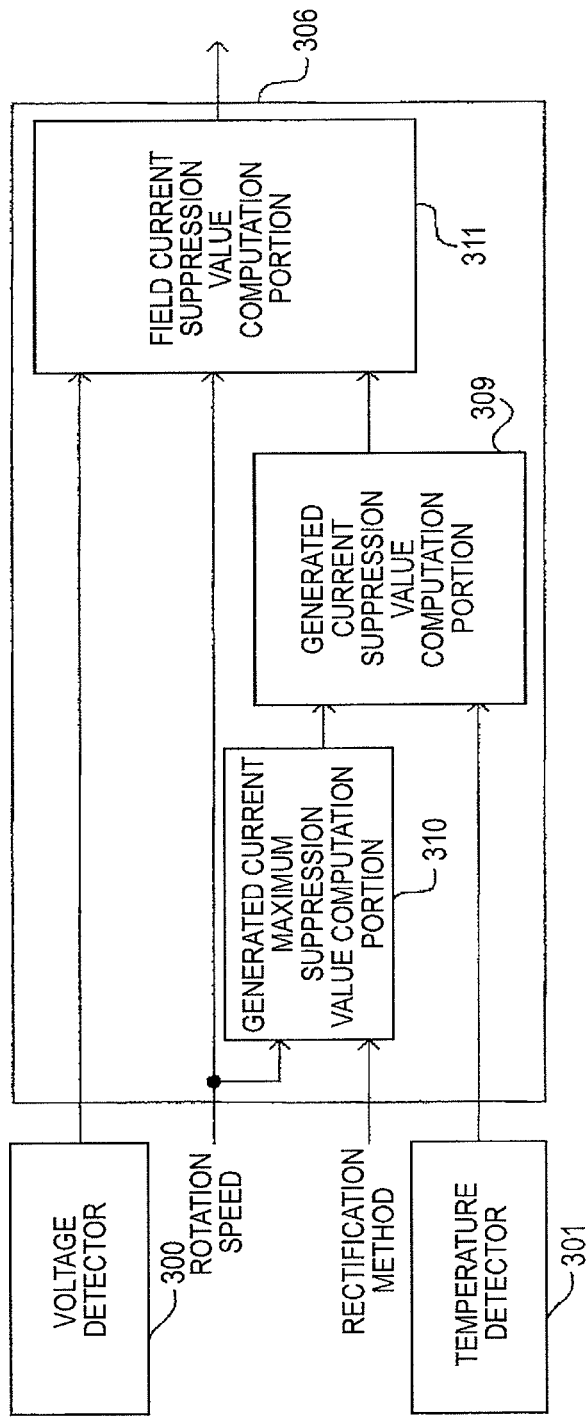
FIG. 14 is a view showing the configuration of a temperature rise suppression portion according to a third embodiment of the invention.

Referring to FIG. 14, the temperature rise suppression portion 306 is formed of a generated current suppression value computation portion 309, a generated current maximum suppression value computation portion 310, and a field current suppression value computation portion 311.

The generated current maximum suppression value computation portion 310 receives, as inputs, a rotation speed and a rectification method and computes a generated current maximum suppression value corresponding to the rotation speed. The power converter part 220 in the generator 102 is formed of a switching element composed of a switching element and an accompanying parasitic diode and capable of performing synchronous rectification and diode rectification by the switching element.

The synchronous rectification is characterized in that a loss and heat generation are smaller than those by the diode rectification because a current is allowed to pass by the switching element. Meanwhile, the diode rectification is characterized in that a loss occurs due to a counter voltage of the diode and heat generation is large. As described above, heat generation by the switching element varies with the rectification methods. Hence, the generated current maximum suppression value is preliminarily obtained empirically-based data in which the generated current with which a temperature rise takes a desired value is set for every rotation speed, and the data is set for each rectification method (synchronous rectification and diode rectification).

The generated current maximum suppression computation portion 310 computes a generated current maximum suppression value on the basis of the rectification method and the rotation speed of the generator 102. The generated current suppression value computation portion 309 receives an output of the temperature detector 301 and an output of the generated current maximum suppression value computation portion 310 as inputs and calculates a generated current suppression value in accordance with the detected temperature and the computed generated current maximum suppression value. The field current suppression value computation portion 311 receives the B-terminal voltage, which is an output of the voltage detector 300, the rotation speed of the generator 102, and the calculated generated current suppression value as inputs and computes a field current suppression value.

Figure 15:
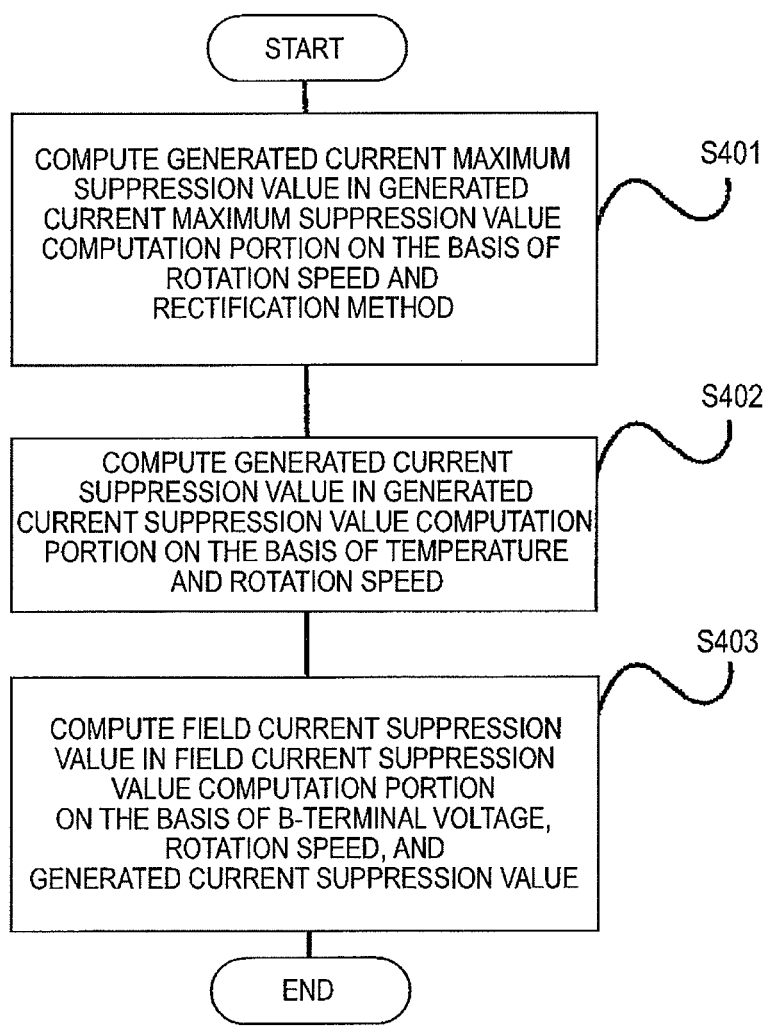
FIG. 15 is a flowchart depicting an operation of the temperature rise suppression portion according to the third embodiment of the invention.

FIG. 15 is a flowchart depicting an operation of the temperature rise suppression portion 306 of the third embodiment.

In Step S401, the rectification method and the rotation speed of the generator 102 are inputted into the generated current maximum suppression value computation portion 310 and the generated current maximum suppression value corresponding to the rectification method and the rotation speed is computed therein. It should be noted that the generated current maximum suppression value corresponding to the rectification method takes a smaller value when the rectification method is the diode rectification than when the rectification method is the synchronous rectification. In Step S402, the temperature, which is an output of the temperature detector 301, and the generated current maximum suppression value computed in Step S401 are inputted into the generated current suppression value computation portion 309 and the generated current suppression value is computed therein. In Step S403, the B-terminal voltage of the generator 102, the rotation speed of the generator 102, and an output of the generated current suppression value computation portion 309 are inputted into the field current suppression value computation portion 311 and the field current suppression value is computed therein.

According to the third embodiment configured as above, the generated current maximum suppression value is calculated in accordance with the rotation speed and the rectification method of the generator 102 and the generated current suppression value is computed in accordance with the detected temperature and the calculated generated current maximum suppression value. It thus becomes possible to compute the generated current suppression value corresponding to the rectification method of the generator 102. Accordingly, because the field current suppression value corresponding to the rotation speed and the rectification method of the generator 102 is computed, it becomes possible to obtain a power converter control apparatus in which temperatures in the respective parts do not exceed the allowable value even when the rectification method is changed during a power generation operation.

Fourth Embodiment

A power converter control apparatus according to a fourth embodiment of the invention will now be described on the basis of FIG. 16. In the fourth embodiment, only the temperature rise suppression portion 306, which is a difference from the third embodiment above, will be described in detail.

The configuration of a temperature rise suppression portion 306 of the fourth embodiment will be described using FIG. 16.

Figure 16:
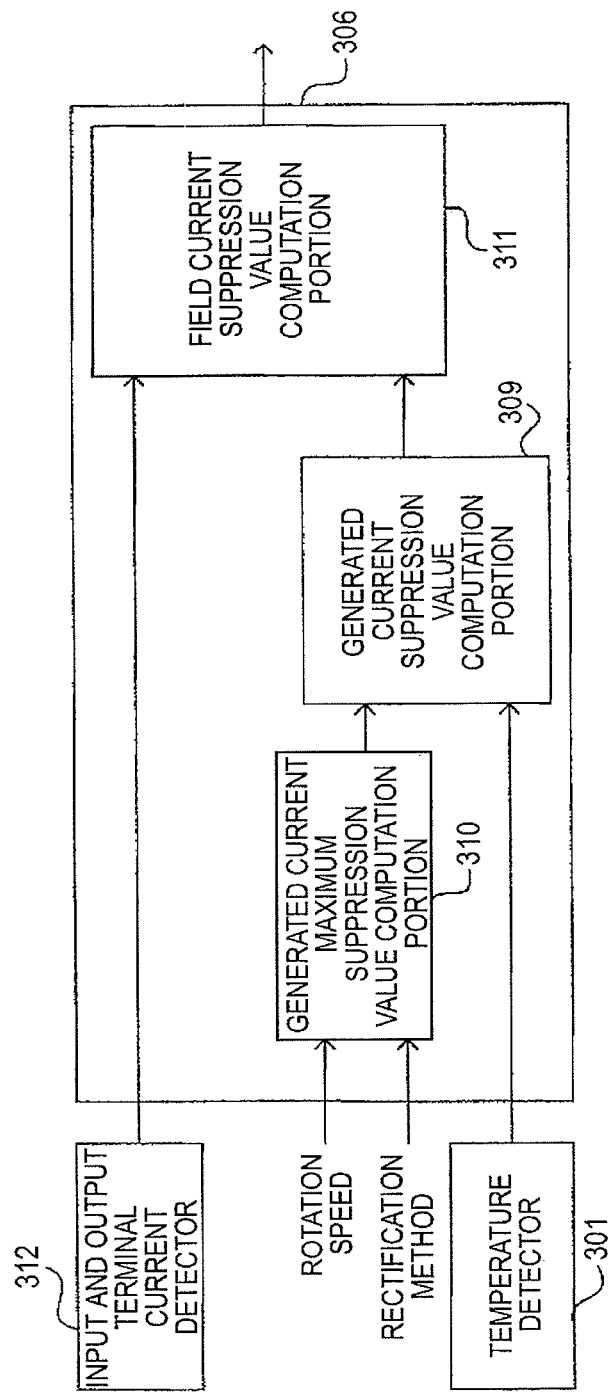
FIG. 16 is a view showing the configuration of a temperature rise suppression portion according to a fourth embodiment of the invention.

Referring to FIG. 16, the temperature rise suppression portion 306 is formed of a generated current suppression value computation portion 309, a generated current maximum suppression value computation portion 310, and a field current suppression value computation portion 311.

The control apparatus part 220 includes an input and output terminal current detector 312 that detects a current at the input and output terminal and inputs an output thereof into the temperature rise suppression portion 306. The generated current maximum suppression value computation portion 310 receives the rotation speed and the rectification method as inputs and computes a generated current maximum suppression value corresponding to the rotation speed.

Because an amount of heat generation of the switching element varies with the rectification methods, the generated current maximum suppression value computation portion 310 computes the generated current maximum suppression value on the basis of the rectification method and the rotation speed of the generator 102.

The generated current suppression value computation portion 309 receives an output of the temperature detector 301 and an output of the generated current maximum suppression value computation portion 310 as inputs and calculates a generated current suppression value in accordance with the detected temperature and the generated current maximum suppression value. The field current suppression value computation portion 311 receives an output of the input and output terminal current detector 312 and an output of the generated current suppression value computation portion 309 as inputs and computes a field current suppression value.

Figure 17:
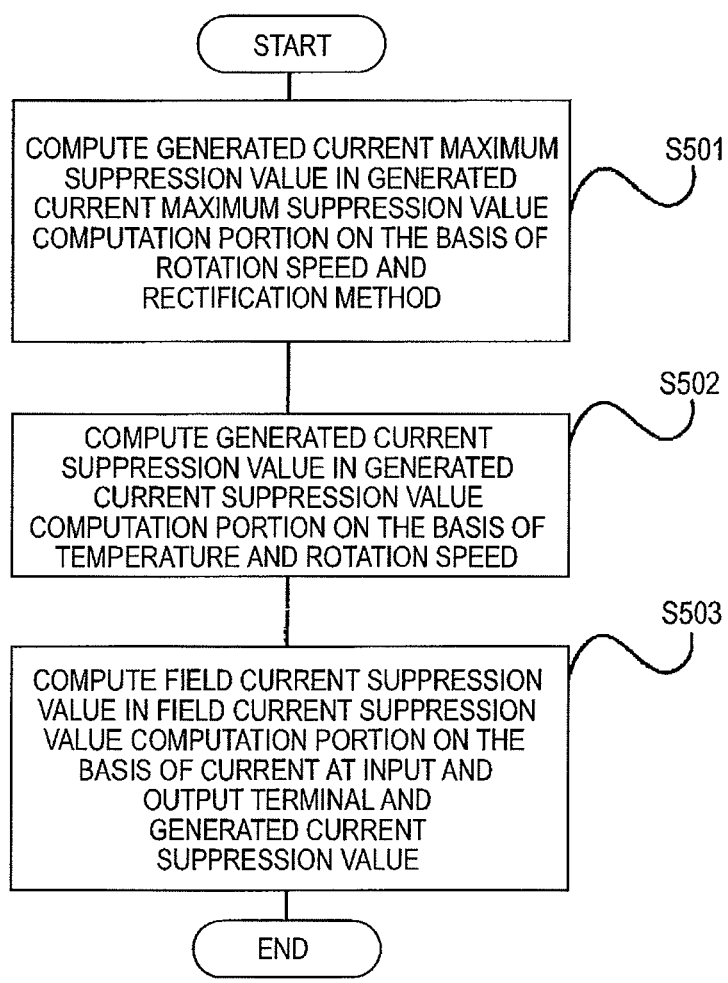
FIG. 17 is a flowchart depicting an operation of the temperature rise suppression portion according to the fourth embodiment of the invention.

FIG. 17 is a flowchart depicting an operation of the temperature rise suppression portion 306 of the fourth embodiment.

In Step S501, the rectification method and the rotation speed of the generator 102 are inputted into the generated current maximum suppression value computation portion 310 and the generated current maximum suppression value corresponding to the rectification method and the rotation speed is computed therein.

In Step S502, the temperature, which is an output of the temperature detector 301, and the generated current maximum suppression value computed in Step S501 are inputted into the generated current suppression value computation portion 309 and the generated current suppression value is computed therein.

In Step S503, the current, which is an output of the input and output terminal current detector 312 detecting a current at the input and output terminal of the generator 102, and an output of the generated current suppression value computation portion 309 are inputted into the field current suppression value computation portion 311 and the field current suppression value is computed therein.

The field current suppression value computation portion 311 receives an output of the generated current suppression value computation portion 309 and an output of the input and output terminal current detector 312 as inputs. The field current suppression value computation portion 311 may compute the field current suppression value by constructing feedback control so that the current, which is an output of the input and output terminal current detector 312, follows an output of the generated current suppression value computation portion 309 or may use a known technique and compute the field current suppression value such that the current of the input and output terminal current detector 312 follows the generated current suppression value.

According to the fourth embodiment configured as above, the generated current maximum suppression value is computed in accordance with the rotation speed and the rectification method of the generator 102 to compute the generated current suppression value in accordance with the detected temperature and the computed generated current maximum suppression value, and the field current suppression value is computed on the basis of the current at the input and output terminal and the computed generated current suppression value. Hence, in comparison with a case where the field current suppression value is computed by the map method using the B-terminal voltage, the rotation speed, and the generated current suppression value as inputs, it becomes possible to compute the field current suppression value more precisely, which in turn makes it possible to compute the generated current suppression value corresponding to the rotation speed and the rectification method.

The temperature detector 301 in the first through fourth embodiments detects temperatures of the switching elements 223, 224, and 221 in the power converter part 220. It should be appreciated, however, that the temperature detector 301 may detect temperatures of all the switching elements or a temperature of any one of the switching elements as a representative. By determining the generated current maximum suppression value corresponding to a temperature rise of the switching element(s), it becomes possible to prevent the switching element(s) from damage caused by a temperature rise.

The temperature detector 301 may detect a temperature of the control apparatus part 210. By determining the generated current maximum suppression value corresponding to a temperature rise of the control apparatus part, it becomes possible to prevent the control apparatus part from damage caused by a temperature rise.

The temperature detector 301 may detect a temperature of the three-phase armature winding 201. By determining the generated current maximum suppression value corresponding to a temperature rise of the armature winding, it becomes possible to use the generator 102 in an allowable temperature range of the armature winding.

The temperature detector 301 may detect a temperature in any one of the regions specified above or temperatures in all the regions. By computing the respective generated current suppression values and computing the field current suppression value by selecting the minimum generated current suppression value, it becomes possible to protect the generator in a region where the temperature rises high.

Various modifications and alterations of this invention will be apparent to those skilled in the art without departing from the scope and spirit of this invention, and it should be understood that this is not limited to the illustrative embodiments set forth herein.

What is claimed is:

1. A power converter control apparatus connected to a multi-phase AC generator having an armature winding and a field winding and configured to control an output of the multi-phase AC generator, comprising:
   a power converter part including,
      a bridge circuit that is formed of a positive arm switching element and a negative arm switching element and rectifies an AC current as an output of the armature winding to a DC current, and
      a field circuit that controls conduction of the field winding using a field switching element; and
   a control apparatus part including,
      a field current detection portion that detects a field current flowing to the field winding,
      a temperature detection portion that detects a temperature of any one of the multi-phase AC generator, the power converter part, and the control apparatus part,
      a field current instruction computation portion that computes a field current instruction value on the basis of an operation state of the multi-phase AC generator,
      a temperature rise suppression portion that computes a generated current suppression value on the basis of an output of the temperature detection portion and computes a field current suppression value on the basis of the generated current suppression value,
      a field current instruction selection portion that selects one of outputs of the field current instruction value and the field current suppression value whichever is the smaller, and
      a field current control portion that controls the field current so that an output of the field current instruction selection portion coincides with the field current flowing to the field winding.

2. The power converter control apparatus according to claim 1, wherein:
   the temperature rise suppression portion includes a generated current suppression value computation portion that has a first temperature threshold and makes generated current suppression a maximum in accordance with a time in a case where the temperature detected by the temperature detection portion is not lower than the first temperature threshold.

3. The power converter control apparatus according to claim 1, wherein:
   the temperature rise suppression portion includes a generated current suppression value computation portion that has a second temperature threshold and makes generated current suppression a maximum in a case where the temperature detected by the temperature detection portion is not lower than the second temperature threshold.

4. The power converter control apparatus according to claim 1, wherein:
   the temperature rise suppression portion includes a generated current suppression value computation portion that has a third temperature threshold and a fourth temperature threshold where the third temperature threshold is lower than the fourth temperature threshold, and computes the generated current suppression value in a case where the temperature detected by the temperature detected portion is not lower than the third temperature threshold and makes generated current suppression a maximum in a case where the temperature detected is not lower than the fourth temperature threshold.

5. The power converter control apparatus according to claim 1, wherein:
the temperature rise suppression portion includes a generated current maximum suppression value computation portion that determines, in accordance with a rotation speed of the multi-phase AC generator, maximum generated current suppression of a generated current suppression value computation portion computing the generated current suppression value on the basis of an output of the temperature detection portion.

6. The power converter control apparatus according to claim 1, wherein:
the switching element in the power converter part is formed of a transistor and a diode connected to the transistor by inverse-parallel connection;
the temperature rise suppression portion determines maximum generated current suppression in accordance with which one of synchronous rectification and diode rectification is adopted for the switching element in the bridge circuit of the multi-phase AC generator and a rotation speed of the multi-phase AC generator; and
a generated current maximum suppression value by the diode rectification is smaller than the generated current maximum suppression value by the synchronous rectification.

7. The power converter control apparatus according to claim 5, further comprising:
a voltage detection portion that detects a voltage generated between a power input and output terminal of the multi-phase AC generator and a reference potential,
wherein the temperature rise suppression portion includes a field current suppression value computation portion that computes the field current suppression value on the basis of an output of the voltage detection portion, the rotation speed, an output of the generated current suppression value computation portion, and a rectification method of the bridge circuit.

8. The power converter control apparatus according to claim 6, further comprising:
a voltage detection portion that detects a voltage generated between a power input and output terminal of the multi-phase AC generator and a reference potential,
wherein the temperature rise suppression portion includes a field current suppression value computation portion that computes the field current suppression value on the basis of an output of the voltage detection portion, the rotation speed, an output of the generated current suppression value computation portion, and a rectification method of the bridge circuit.

9. The power converter control apparatus according to claim 5, further comprising:
an input and output terminal current detection portion that detects a current flowing to an input and output terminal of the multi-phase AC generator,
wherein the temperature rise suppression portion includes a field current suppression value computation portion that computes the field current suppression value on the basis of an output of the input and output terminal current detection portion and an output of the generated current suppression value computation portion.

10. The power converter control apparatus according to claim 6, further comprising:
an input and output terminal current detection portion that detects a current flowing to an input and output terminal of the multi-phase AC generator,
wherein the temperature rise suppression portion includes a field current suppression value computation portion that computes the field current suppression value on the basis of an output of the input and output terminal current detection portion and an output of the generated current suppression value computation portion.

11. The power converter control apparatus according to claim 1, wherein:
the temperature detection portion detects a temperature of the switching element in the bridge circuit.

12. The power converter control apparatus according to claim 1, wherein:
the temperature detection portion detects a temperature of the control apparatus part.

13. The power converter control apparatus according to claim 1, wherein:
the temperature detection portion detects a temperature of the armature winding in the multi-phase AC generator.

* * * * *